United States Patent Office 3,281,839
Patented Oct. 25, 1966

3,281,839
AUTOMATIC MAPPER METHOD AND APPARATUS
William E. Triest, Chevy Chase, and August P. Arneth, Jr., Rockville, Md., assignors to the United States of America as represented by the Secretary of the Air Force
Filed Oct. 20, 1964, Ser. No. 405,307
9 Claims. (Cl. 343—7.7)

This invention relates to radio locator systems and, more particularly, to a mapping radar system adapted to automatically and selectively filter object location data.

In the art of processing data representative of the position of various objects within any given area such as provided by radar data, it is desirable to filter the information such that data representative of the position of certain objects is not processed. In prior art devices where the data is displayed as intensified spots on the screen of a cathode ray tube, an opaque fluid placed on the screen is commonly used to delineate areas on the data display where data positions are not to be processed. The manual application of such opaque films is called "mapping." The result of this "mapping" is to exclude data under mapped areas from processing; namely, mapping is a means for filtering, or one technique of filtering.

One known method of mapping in the prior art employs an optical filter arrangement interposed between a data source and data processing apparatus wherein object location data is displayed on a cathode ray tube. To suppress the flow of irrelevant data to the data processing apparatus, the section of the cathode ray tube corresponding to the area to be filtered is treated by application of a fluid to reduce the intensity of the display of such area. A photoelectric device is located so that its photosensitive element will receive enough light to cause an electrical signal output from the photoelectric device, when non-filtered or higher intensity objects are displayed on the cathode ray tube. As a result of response by the photoelectric device to display of an object, information relating to such object is applied to the data processing system, while simultaneously reintensifying its own display, thereby providing a dual intensification system for visual monitoring of the display. However, this manual method of mapping has several inherent disadvantages: (1) Mapping fluids are difficult to apply and remove as rapidly as the situations requiring masking changes; (2) the efficiency of human mappers vary; (3) there are more chances of losing legitimate signals in mapped areas because of the use of area masking rather than quantum or range box mapping; (4) the conversion of radar data from digital to analog form in systems in which a central computer receives data in digital form from many radars for mapper display requires considerable electrical and mechanical equipment if the radar data display is to be created directly from digital data received at the central computer site; for example, it is customary to generate a rotating magnetic field on which the radar sweep is superimposed, and to synchronize this rotating magnetic field with radar antenna rotation by using North and Azimuth digital signals, so that the range sweep of a PPI display starts a new radial sweep for each new azimuth pulse and thus display target data with correct relative position on an analog display so that mapping can be done; and (5) the operators can block the optical signal path between the cathode ray tube and the photo tube pickup with their hands and arms which may result in a loss of desired data.

In accordance with the principles of the present invention, both desired and undesired data are applied to the filter arrangement, but only data which is identified as legitimate object location data is passed to the processing apparatus.

Accordingly, a primary object of the present invention is to provide improved data filtering apparatus.

Another object of the present invention is to provide improved apparatus for automatically filtering object location data.

A further object of the present invention is to provide improved mapping apparatus adapted to automatically filter object position data from an associated radar site and to provide substantially instantaneous target location data to an output device in response to selected objects.

To accomplish these and other objectives, the present invention provides an automatic mapping system operating on quantized range box returns.

In the instant invention radar returns are quantized in range and azimuth. There are 256×64 quanta, or 64 range quanta for each azimuth quantum. The phrase "quantized range box returns" (rather than just "range box returns") refers to one of the 256×64 quanta, in which there is a return if a target was detected by the radar in the area represented by a particular quantum. Each of the 256×64 quanta is treated individually as data arrives over the digital data lines; processing is done on a "per-quantized-range-box" basis.

The past history of the individual range boxes is stored and is utilized to inhibit certain object location returns by a predetermined criteria. A magnetic film in combination with a small magnetic core plane comprises the nucleus of the automatic mapping system. In the instant embodiment information from seven radar scans is stored. Thus, with seven bits of history data available for any range-azimuth quantum ("range box"), a digital device is arranged to accept or reject a target on the basis of past history. A target which recurs repeatedly in a "range box" is fixed and does not represent an aircraft; it is therefore rejected.

Other objects and many of the attendant advantages of this invention will be readily appreciated as the same becomes better understood by the following detailed description when considered in connection with the accompanying drawings wherein.

Figure 1:
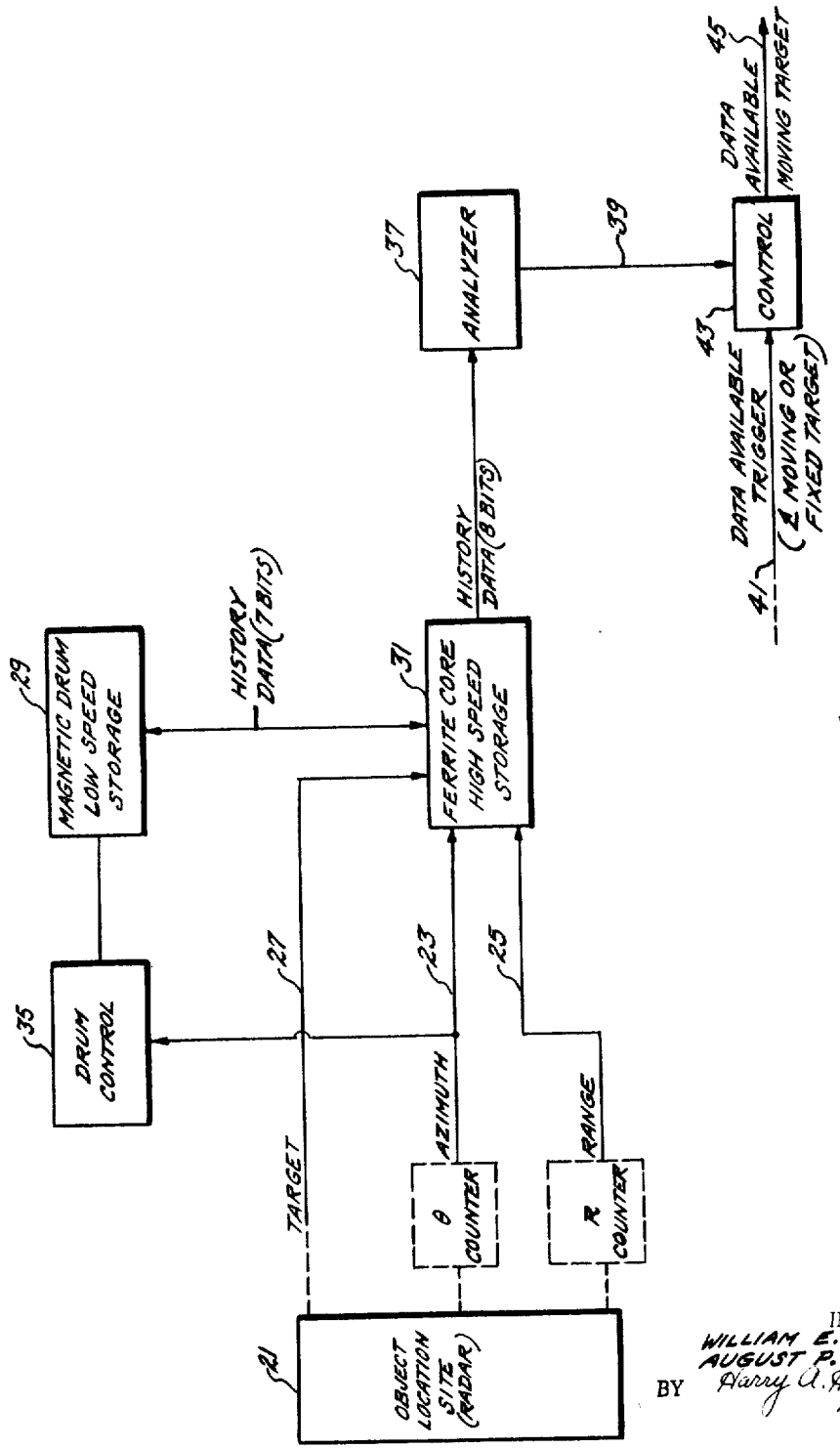
FIG. 1 is a block diagram of the preferred embodiment.

Referring now to FIG. 1, object location data consisting of azimuth, range and target signals are received from remote position object location site 21 on conductors 23, 25 and 27, respectively. In the instant embodiment, object location site 21 comprises a polarized transmitting antenna rotating about its vertical axis wherein the object is a target. The radio distance and the angular position of the target from the antenna comprise the range and azimuth of such target. In the particular example herein described, azimuth signals occur 256 times per scan of the rotating antenna, or approximately once for each 1.4° of radar antenna rotation. Range information on conductor 25 is a sequence of short duration pulses or signals which recur at approximately 625 microsecond intervals. A total of 64 range signals occur between successive azimuth signals. For each range signal on conductor 25 there is target information in the form of an accompanying target signal if a target has, in fact, been detected by the radar for the quantum represented by the range signal, within the azimuth segment being reported. Thus, for each range signal there is either a target or no target—indicated by presence or absence, respectively, of the target signals. Target information on conductor 27 consist of short duration pulses which occur in synchronism with the range signals on conductor 25. Thus, on conductor 27 there is a pulse or not, coincident with each pulse on conductor 25, depending on whether a target is being reported or no target was detected at the corresponding range. Each target signal appears in synchronism with a range signal but is dependent upon the fact of location of an object as the particular range and azimuth in which it is produced. To simplify the ensuing description, the antenna will be assumed to rotate at a nominal speed of 6 r.p.m. The combined magnetic drum memory 29 and ferrite core memory 31 provide a history file or each of the quanta involved. A quantum as herein designated is the area about the coordinate intersection of an azimuth and range pulse. In the preferred embodiment, a total of 256×64 quanta are included in one complete scan. The history file stored in either drum storage 29 or ferrite core storage 31 is a seven bit binary word indicating the presence or absence of a target in the associated quantum for the previous seven consecutive radar scans. The magnetic drum in the instant embodiment is a 5-inch diameter drum, rotating at 6000 r.p.m., with 4096 28-bit registers. Thus, the entire history of each of the 16,384 quanta is stored on drum 29 after 7 consecutive radar scans. Ferrite core storage device 31 consists of 32, 32-bit registers. Each register provides 8-bit storage for each quantum. Each register contains 4 of the 8-bit history words. The 8-bit storage consists of the 7-bit history fed from magnetic drum 29 (via conductor 33 to ferrite core storage 31) and an additional bit indicating the current status of a target fed to core 31 via conductor 27. Drum control device 35 provides control of transfer of information between a magnetic drum storage 29 and ferrite core storage 31. The 8-bit word in ferrite core storage 31 is read-out to analyzer 37. Analyzer 37 distinguishes between legitimate and non-legitimate targets. As herein defined, a legitimate target is a moving object. For each target detected by the rotating antenna, a signal is applied via conductor 41 to control device 43 which functions as a gate under the control of conductor 39 to pass information via conductor 45 to the data processing machine. For a moving target, the data signal or conductor 41 will pass through control device 43 to the data processing machine, while a non-moving target will be inhibited by the signal on conductor 39 from analyzer 37.

Figure 2:
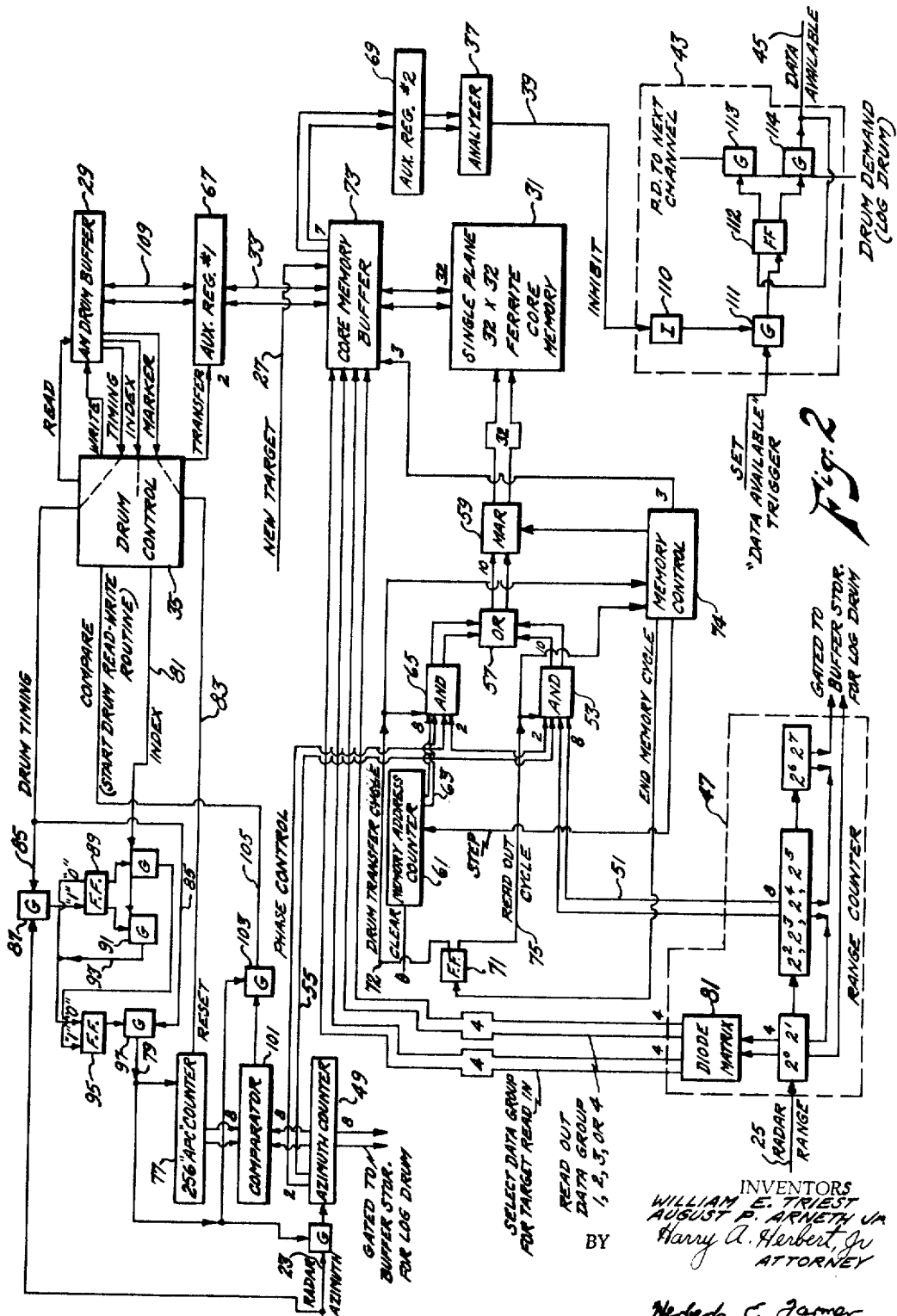
FIG. 2 is a logical diagram of the history information flows.

Referring now to FIG. 2, there is illustrated a logical diagram of the manner in which the history information is generated, restored and recovered by the instant automatic mapping device. The entire history of each of the 16,384 quanta previously described is stored on drum device 29 after seven consecutive radar scans. Ferrite core plane 31 functions as a buffer device to permit relatively short access time to the information stored on magnetic drum 29, and to provide short term storage for data currently active.

Sixteen registers in the ferrite core memory are sufficient to store complete history data for one azimuth. Thus, half of the 32 registers in ferrite memory 31 are used to provide "read-out" service to analyzer 37, while the other half are used to exchange data with drum memory 29. In this way, core memory 31 has a capacity (1,024 bits) for holding the past history of two azimuth segments (2 azimuths×64 pulses/azimuth×8 scans/azimuth=1,024 bits): the segment for which data is currently being received; and a combination of data for the preceding azimuth segment and the next azimuth segment to be used. Namely, while one-half of core memory 31 is loaded with data to correlate with current radar returns, the other half is supplying data from the past azimuth segment to the drum and simultaneously is being loaded with past history data for the azimuth section which is next after the current one.

Since ferrite memory 31 performs a dual function, i.e., drum transfer and read-out, the data for addressing a memory must come from two sources. These two sources are the range and azimuth inputs. The four bits, $2^2$ through $2^5$, in range counter 47 which uniquely identify one of the 16 registers in memory 31, and are applied via conductors 51 through logical And circuit 53 to Or circuit 57, for read-out. The four bits from memory address counter 61 are applied through conductors 63 and And circuit 65 to Or circuit 57 for drum transfer. This combination of the range and azimuth inputs designate an address to memory address register 59 of the ferrite core memory. Memory address register 59 can select any one of the 32 registers in ferrite memory 31.

If registers 1–16 are referred to as section "A," and registers 17–32 are referred to as section "B," the particular half of the memory being utilized depends on what the particular bit on conductor 55 is. The lowest order bit from azimuth counter 49 via conductor 55 constitutes the highest order bit in memory address register 59. Therefore, a 1 in the lowest order bit of azimuth counter 49 causes memory address register 59 to select section "B," while a 0 in this position selects section "A" of ferrite core memory 31.

Ferrite memory sections "A" and "B" are functionally interchanged once per azimuth. Opposite halves of memory 31 are selected depending upon which of And circuits 53 or 65 supply signals to memory address register 59. This is caused by also connecting conductors 55 to And circuit 53, and then switching. Namely, the $2^4$ memory address bit is provided by the $2^0$ bit of azimuth counter 49. The $2^0$ azimuth is added as the high order (5th) bit of one address source (e.g. the radar range) while the complement is added as the high order (5th) bit of the other address (e.g. memory address counter).

With this arrangement, for example, an odd-numbered azimuth (i.e. $2^0$="1") causes core memory section "A" to be in the drum-transfer phase and memory section "B" to be in the read-out phase. This operation is reversed for even numbered azimuths; namely, memory section "A" is in the read-out phase and section "B" is in the drum-transfer phase.

Since core memory 31 performs two functions, drum transfers and read-out, it is necessary that these functions be time-shared or interleaved in their operation. Read-out reference is required once every 625 microseconds, and drum transfer reference is required once every 256 drum registers or every 640 microseconds. The logic buffering provided by auxiliary registers 1 and 2, designated as 67 and 69 on the drawing respectively, are such that a 15 or 20 microsecond hold-up for either function will have no effect on the overall operation; thus, there is no need to establish a priority for either function. In the instant embodiment, "transfer" memory cycles are interleaved with "read-out" memory cycles on a 1 to 1 basis. This is accomplished by complementing flip-flop 71 from memory control device 74 with a pulse on the end of each memory cycle and using the outputs of flip-flop 71 to determine which functional cycle the memory is to perform next. As shown in FIG. 2, the outputs from flip-flop 71 on conductors 72 and 75 serve as inputs to And circuits 65 and 53, respectively. Since only one flip-flop output can be high, while the other output is low, at any one particular time, an output can be provided to activate only one of the And circuits, 53 or 65. The two low order bits in range counter 47, designated as $2^0$ and $2^1$, control diode matrix which will select one of the 4 history bits currently in the 32-bit history words in a 32-bit register. The manner in which this selection occurs through core memory buffer 73 is more fully described hereinafter.

Summarizing, the aforecited selections, flip-flop 71 selects either a drum transfer or a read-out cycle; the low order azimuth bit from azimuth counter 49 selects a section of ferrite memory 31 to be used midst $2^2$ through $2^5$ of the range counter; the contents of memory address counter 61 select a specific 32-bit register in core memory 31 in the section designated by the lowest order bit from azimuth counter 49; and the two lowest order bits in range counter 47 select a specific grouping of 8 bits within this selected register.

The magnetic drum employed in the preferred embodiment of the automatic mapper is a 5″ diameter drum rotating at 6,000 r.p.m. with 4096 28-bit registers per field. One field is required to store the 114,688 bits per scan; that is, 16,384 seven-bit words. As in the case of the core memory, four of these words are stored in each register, thereby utilizing the 28-bit registers. Each 28-bit register contains 7-bits of data for four successive ranges in one azimuth sector. The drum information on one azimuth is distributed equally around the drum in 16 registers. Successive drum registers for any given azimuth are interleaved by 256 on the drum. In taking information (reading) from the drum to store in core memory or in transferring from core memory to the drum (writing), a scale-of-256 counter 77 is used to count timing pulses from conductor 79 and start read-write circuitry in operation.

The drum read-write control circuitry operates in the following manner. The drum generates an index signal on conductor 81 once per drum revolution and generates a marker signal on conductor 83 for every 256 registers. Timing signals are generated on timing track, shown as conductor 85, one pulse for each register. Thus, for every 256 pulses on conductor 85 there is one pulse on conductor 83. A radar azimuth input pulse, which is essentially a signal of 625 microseconds in duration, conditions gate circuit 87. The next drum timing pulse applied through conductor 85 samples gate circuit 87 which then turns flip-flop 89 to the "one" state thereby conditioning gate circuit 91. The next index signal applied via conductor 81 through drum control 35 is gated through gate circuit 91 via conductor 93 to turn flip-flop 95 to the "zero" state and reset flip-flop 89 to the "zero" state. The output from flip-flop 95 conditions gate circuit 97, which is sampled by the next timing pulse on conductor 85, and generates an output on conductor 79. Azimuth counter 49 indicates the particular azimuth which the radar is scanning at any given time. Whenever the contents of APC counter 77, identifying the position of the drum register, is equal and corresponds to that in azimuth counter 49, an output from comparator circuit 101 conditions gate circuit 103. The next timing pulse from conductor 79 samples gate circuit 101 and generates a "compare" signal on conductor 105 to initiate the following drum sequence. The information in drum buffer register 67 is written via conductor 109 to drum 29. The drum register allocated to the previous azimuth is in the right position whereby the information written on drum 29 is the history or partial history of the previous azimuth. The drum skips the next azimuth word and reads the following azimuth word into buffer register 67. Thus, at any given time interval, ferrite core memory 31 is simultaneously operating on three azimuths, identified as "present," "preceding" (which identifies the immediately preceding azimuth), and "following" (which identifies the azimuth immediately following). While one section of the core memory is providing history information relative to the present azimuth to analyzer 37, the other half of ferrite core memory 31 is engaged in returning information on the preceding azimuth to drum 29 in exchange for information on the succeeding azimuth. Thus, upon completion of the analyzing of a particular azimuth, the following azimuth is available for analysis.

For example, if the seventh azimuth sector were the current radar data, the θ counter would read 00000111, and one half of core memory 31 would contain the history on the sixth sector, initially. Thus, while one half of memory 31 is engaged in supplying data to correlate with current radar returns in the seventh azimuth sector, the other half of core memory is transferring data on the sixth sector to drum 29 while simultaneously receiving past history data for the eighth azimuth sector.

On the next azimuth pulse on conductor 88, azimuth counter 49 is stepped by one, thus complementing the lowest order bit which, as previously described, is applied through And circuits 65 and 53, inverts the functions of the sections of the core memory, that is, operates on the other half of the memory. The above sequence is then repeated for each azimuth signal.

By operating in the above described manner, core memory 31 effectively operates as a buffer for drum 29, thereby circumventing the normally long access of the drum. From the previous description, there will be noted that the word transferred from the drum to the ferrite core memory contains seven history bits for each range. Information defining the present status of the particular range quantum is introduced to core memory buffer 73 via conductor 27 designated "new target." Simultaneously, with the information on conductor 27, the seven history bits of the particular azimuth being operated upon are applied from the ferrite core memory to core memory buffer 73 thereby forming an 8-bit word identifying the present status as well as the past history of the particular azimuth.

Thus, each register in drum 29 contains four sequential 7-bit range boxes; however, each register in core memory 31 contains four 8-bit core slots. Therefore, in transferring contents of a core register to a drum register, the oldest data bit is dropped so that only the seven most recent returns are stored on the drum registers. As radar returns are received, timing (or range) pulses step range counter 47. Every fourth timing pulse causes read-out of the next memory register; the individual 7-bit slots within a register are transferred to auxiliary register 69 (and again, returned to core memory 31) under control of the decoded output of the $2^0$ and $2^1$ flip-flops of range counter 47. When the slot is returned to core memory, the eighth bit, representing the presence or absence of a radar return in the current cycle, is added.

During the ferrite core memory cycle, the contents of core memory buffer 73 are non-destructively read-out to auxiliary register 69 and are available immediately to analyzer 37.

Figure 3:
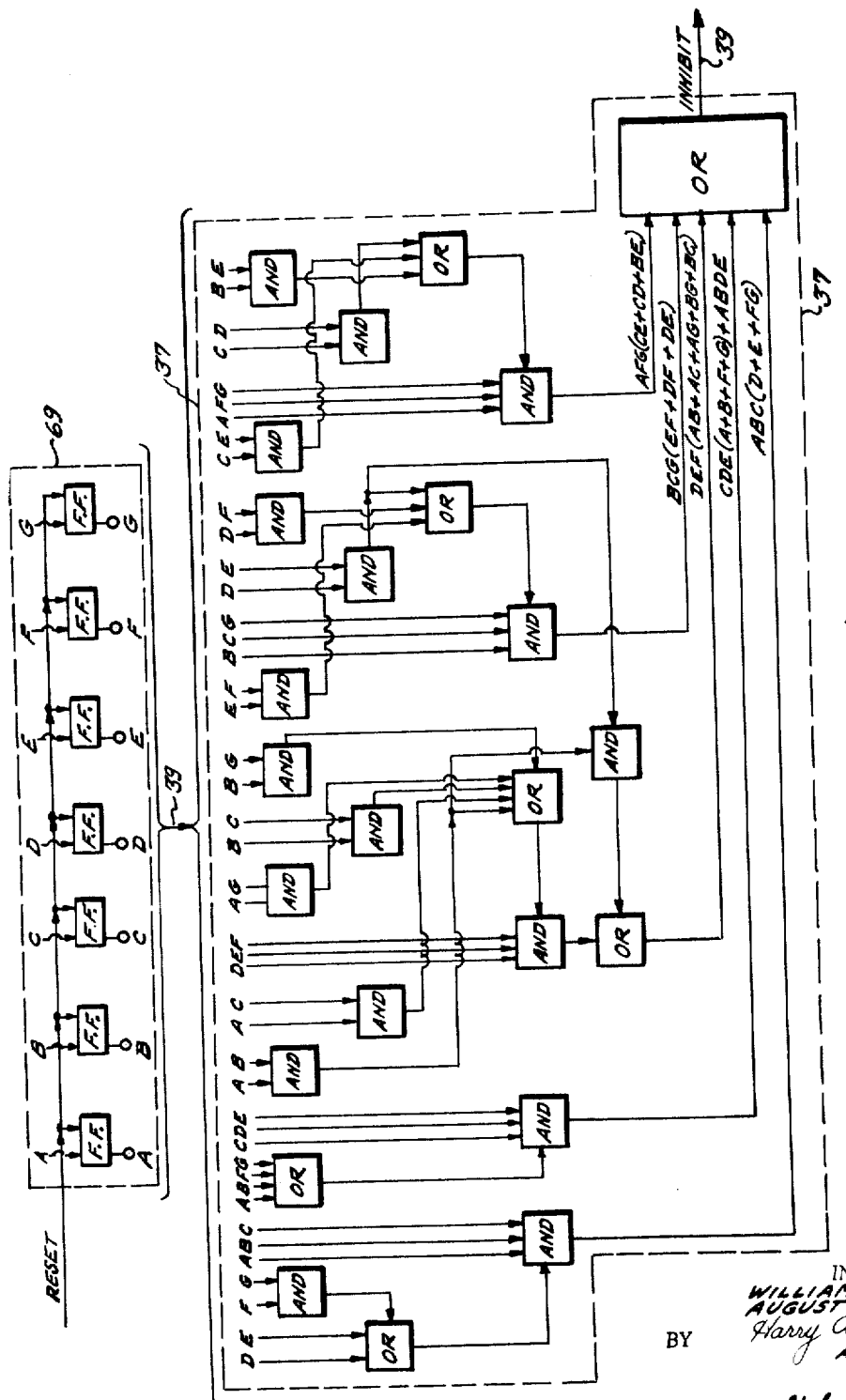
FIG. 3 illustrates the logic circuitry for making the inhibit decision.

The function of analyzer 37 is to recognize the occurrence of history data patterns for which a resultant "inhibit" signal should be produced on conductor 39 indicating that the current target data is not to be considered as a new target. The design of analyzer 37 is based on a predetermined policy for masking out data. A sample design is illustrated in FIG. 3. The 7 data bits corresponding to the past history of a quantum are represented by the logical symbols, A, B, C, D, E, F, and G, where A is the most recent history data, B is the next most recent, etc. Thus, an input of ABDE to analyzer 37 means that the current range box had target returns over the past five radar scans but missed data on the third scan (indicated by C which is missing in the ABDE sequence). In FIG. 3, current data is inhibited if data occurred in at least four of the first five history returns, or if any combination of five or more of the past seven radar scans had radar target data, or if the middle three history data (CDE) and another scan of the seven had target data (e.g., ACDE or CDEF).

The symbology in FIG. 3 is well-known to those skilled in the art. The And and Or circuits perform the analogous operations which correspond to multiplication and addition. Thus, ABC $(D+E+FG)$ means ABCD or ABCE or ABCFG. An inhibit signal is generated on conductor 39 if the first three radar history scans contain data and the fourth, fifth, sixth or seventh scan also contained data. If one or more of the conditions is satisfied, an inhibit signal is generated.

Data on moving targets will not produce patterns of history data which meet the logical conditions for which analyzer 37 will generate an inhibit signal.

Now referring to FIG. 2, the inhibit signal on conductor 39 is supplied to control 43 to prevent stationary target data from being transferred as new data to a data processor. As a result, control 43 is the gate where a discrimination is made between moving and fixed targets.

Only moving targets cause a signal to be produced on conductor 45.

An inhibit signal on conductor 39 is inverted in Inverter 110. Therefore, a signal is applied to gate 111 only if no inhibit signal is on conductor 39, thereby allowing gate 111 to set flip-flop 112 so the next drum demand pulse will produce a data available signal on conductor 45. When a data available signal pulse is produced on conductor 45, flip-flop 112 is simultaneously restored to its OFF condition so that the drum demand pulse is available to other sources of data. The drum demand pulse is a signal from the data processor to indicate it can accept data from one of its sources of input.

From the foregoing description, it may be seen that the instant invention affords several distinct advantages and accomplishes the desired objects. It is to be understood that other changes, modifications and many apparently widely different embodiments of this invention can be made without departing from the scope thereof. For example, the magnetic drum is basically a device in which data can be stored and read in an order determined by the relationships between individual items of data. The magnetic core plane is a device capable of responding to the speeds required for moving data at the maximum rate required to maintain synchronization, so that new data can be associated with its past history. Other physical components in the state-of-the-art performing similar functions can be substituted for the magnetic drum and the magnetic core plane without departing from the scope of this invention.

It is to be further noted that another result can be produced by the instant method of mapping by admitting as data only the leading edge of a large mass target which filled two or more contiguous range boxes. In fact, the policy of the analyzer should be flexible to conform to conditions (weather, target activity, etc.) of the operational environment. The policy can be set as desired by using, inter alia, easily-changed wiring connections, switches or punched card control. Also, individual "weights" can be applied to history data.

Accordingly, it is intended that all matter contained in the above description and shown in the accompanying drawings shall be interpreted as illustrative and not in a limiting sense.

We claim:

1. The method of automatically filtering object location, quantized, radar data from an associated radar set comprising the steps of storing a predetermined number of said quantized signals representative of the past history of individual range quanta in a low-speed digital storage device, feeding current quantized radar signals to a high-speed digital storage device, correlating said current signals with said stored past history signals to determine signals representative of moving and stationary objects, and based on said correlation transmitting to a utilization device only signals representative of a moving object.

2. The method as described in claim 1 wherein said step of correlating further includes the step of synchronizing the transfer of said current and said past history data such that the correlation of said current radar signals with said stored past history signals is performed at the operating rate of said high-speed storage.

3. The method as described in claim 1 which further includes the step of replacing seriatim in said low-speed storage device the oldest of said past history radar signals in said low-speed storage with said current signals to enable said current signals to serve as past history for the next subsequent current radar signals.

4. Automatic mapping apparatus for selectively filtering object location, quantized, radar data from an associated radar set comprising: low-speed digital storage means for storing sequentially a predetermined number of said quantized radar signals, high-speed digital storage means for receiving current quantized signals, transfer control means for controlling the transfer of signals between said low-speed and said high-speed storage means, and analyzer means connected to said transfer control means for differentiating between current radar signals representative of moving and stationary objects.

5. The apparatus described in claim 4 wherein said low-speed storage means comprises a magnetic drum having a plurality of seven-bit registers for storing said quantized radar signals.

6. The apparatus described in claim 4 wherein said high-speed storage means comprises a ferrite core memory having a plurality of eight-bit registers for storing said quantized signals and for storing said current quantized signals.

7. The apparatus described in claim 4 wherein said transfer control means comprises digital synchronizing means enabling said current quantized radar signals to be available to said analyzer means at the operating rate of said high-speed storage means, and means for replacing seriatim the oldest in time of said signals stored in said low-speed storage means with said current signals.

8. The apparatus described in claim 4 which further includes discriminating means connected to said analyzer means for transmitting to a utilization device only signals representative of a moving object.

9. The apparatus described in claim 4 wherein said analyzer means comprises digital logic circuitry means for comparing each of said current quantized signals with a corresponding set of said signals stored in said low-speed storage means and transmitting only signals representative of a stationary target.

References Cited by the Examiner

UNITED STATES PATENTS 2,410,424   11/1946   Brown _____ 343—7.7

CHESTER L. JUSTUS, *Primary Examiner.*

R. D. BENNETT, *Assistant Examiner.*